(No Model.)

J. L. MAXWELL.

CHURN DASHER.

No. 358,684. Patented Mar. 1, 1887.

WITNESSES:
J. D. Taffield
C. Sedgwick

INVENTOR:
J. L. Maxwell
BY Munn & Co
ATTORNEYS.

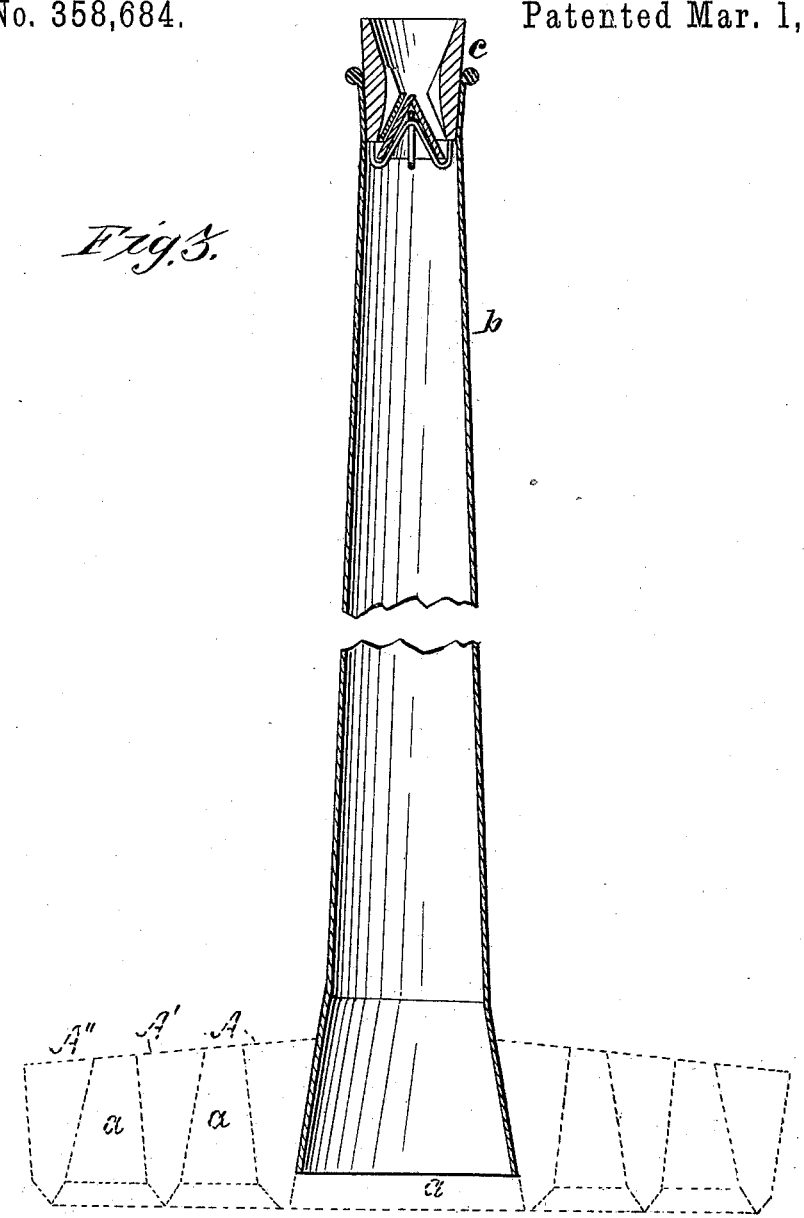

United States Patent Office.

JOHN L. MAXWELL, OF BENTONVILLE, ARKANSAS.

CHURN-DASHER.

SPECIFICATION forming part of Letters Patent No. 358,684, dated March 1, 1887.

Application filed May 8, 1886. Serial No. 201,562. (No model.)

*To all whom it may concern:*

Be it known that I, JOHN LIVINGSTON MAXWELL, of Bentonville, in the county of Benton and State of Arkansas, have invented a new and Improved Churn-Dasher, of which the following is a specification, reference being had to the annexed drawings, forming a part thereof, in which—

Figure 1:
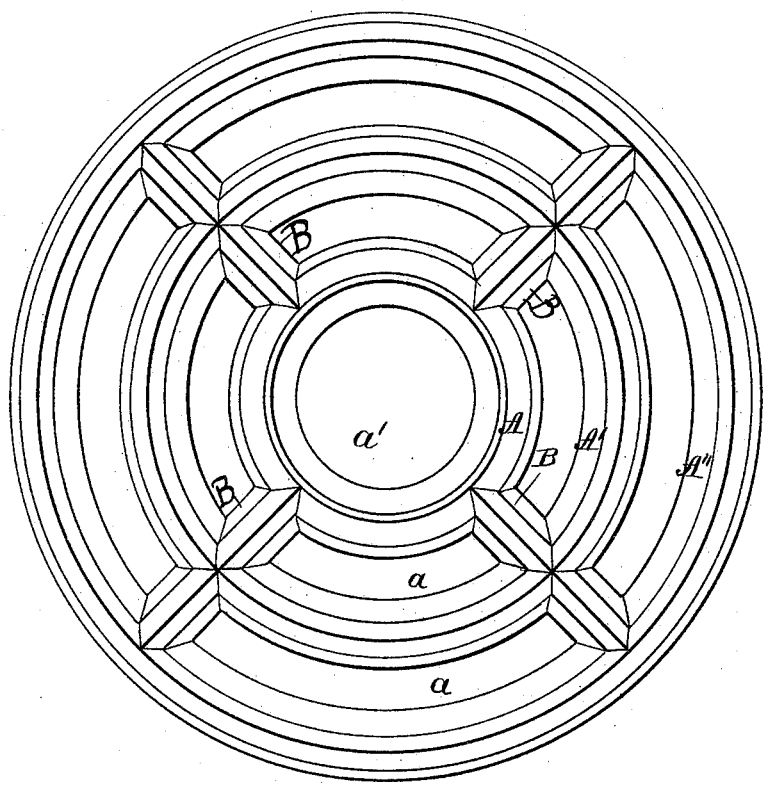
Figure 2:
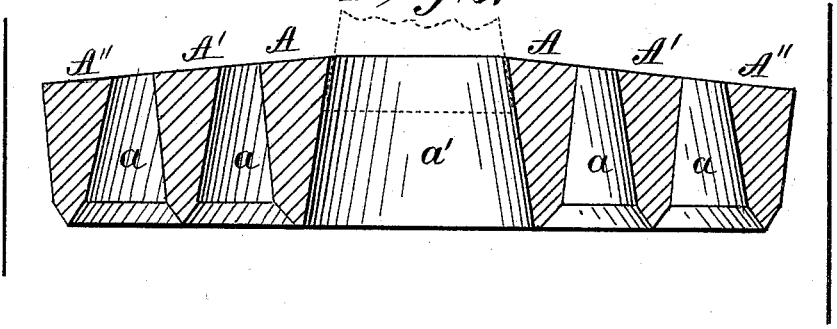

Figure 1 is an inverted plan view. Fig. 2 is a diametrical section showing the lower end of the dasher-rod in dotted lines. Fig. 3 shows my improved dasher with the tubular handle applied, the dasher being shown in dotted lines and the handle in longitudinal section.

Similar letters of reference indicate corresponding parts in all the figures of the drawings.

The object of my invention is to improve the dasher for which Letters Patent No. 189,372 were issued to me April 10, 1877.

My invention consists in a dasher formed of series of beveled rings having between them openings which converge toward the top of the churn-dasher, as hereinafter fully described, and pointed out in the claim.

In the present case I have shown a dasher of circular form; but my improvement applies with equal advantage to dashers of other forms, and I have represented a dasher formed of three concentric rings connected by four radial ribs; but the number of the rings and ribs will be varied according to the size of the churn in which the dasher is to be used.

The rings A A' A" are arranged concentrically and connected with each other by four radial arms, B, formed integrally with the rings. The arms and the rings are wedge shape in cross-section, and their narrower edges are beveled, as shown in Fig. 2, leaving between the arms openings a, which converge toward the top of the dasher.

To the upper part of the central circular opening a' is fitted a dasher-handle, b, which may be of the ordinary form; or it may be made tubular and provided with a valve, c, in the upper end thereof, as shown in Fig. 3. The lower part of the central circular aperture, a', forms an air-chamber, which, when the dasher is used in connection with a tubular handle, receives air from the handle and delivers it below the churn-dasher.

The form of dasher shown and described is readily forced through the cream, the series of beveled edges presented to the cream on the downward stroke of the dasher serving to readily break the oil globules, and the forcing of the cream through the converging openings a tends to still further break up the cream and facilitate the separation of the butter by producing a greater pressure on the cream and by causing friction of the cream on the converging walls of the openings a, and also by increasing the agitation of the cream by forcing it through the narrower ends of the openings a.

The outer ring, A", in connection with the inner wall of the churn, also forms a converging opening, through which the cream must be forced as the dasher is moved downward.

Having thus described my invention, what I claim as new, and desire to secure by Letters Patent, is—

As an improved article of manufacture, a churn-dasher formed of a series of concentric rings, A A' A", and radial arms B, formed integrally with the rings, the rings and the arms being wedge shape in cross section and having V-shaped lower edges, and inclosing between them the spaces a, converging toward the top of the dasher, substantially as herein shown and described.

JOHN L. MAXWELL.

Witnesses:
L. L. CLAY,
C. R. BRUCE.